United States Patent [19]

Hayashi et al.

[11] 4,421,359
[45] Dec. 20, 1983

[54] VEHICULAR ANTI-LOCK BRAKE DEVICE

[75] Inventors: Tsutomu Hayashi, Hoya; Masaie Kato, Musashino; Mitsuru Saito, Koganei, all of Japan

[73] Assignee: Honda Giken Kogyo Kabushiki Kaisha, Tokyo, Japan

[21] Appl. No.: 268,133

[22] Filed: May 29, 1981

[30] Foreign Application Priority Data

Jun. 13, 1980 [JP] Japan .................. 55-79727

[51] Int. Cl.³ .............................. B60T 8/26
[52] U.S. Cl. .................... 303/6 A; 188/344; 188/345; 303/10; 303/116; 303/119
[58] Field of Search ............. 188/344, 349, 345, 181, 188/16, 354, 352; 303/6 A, 6 R, 10-12, 6 C, 116, 119, 13, 114, 113, 115; 60/581, 579, 576, 548, 582; 417/569

[56] References Cited

U.S. PATENT DOCUMENTS

| | | | |
|---|---|---|---|
| 2,189,904 | 2/1940 | Insko | 188/344 X |
| 3,694,038 | 9/1972 | Ingram et al. | 303/115 |
| 3,724,914 | 4/1973 | Skoyles | 303/116 |
| 3,942,844 | 3/1976 | Inada et al. | 303/114 X |
| 3,979,153 | 9/1976 | Ingram et al. | 303/114 X |
| 4,032,200 | 6/1977 | Farr | 303/116 |
| 4,046,427 | 9/1977 | Baynes et al. | 303/116 X |
| 4,141,595 | 2/1979 | Leiber | 303/115 X |
| 4,154,326 | 5/1979 | Wolf | 303/10 X |
| 4,176,886 | 12/1979 | Watanabe | 188/344 X |
| 4,218,100 | 8/1980 | Kervogoret | 303/116 X |
| 4,315,659 | 2/1982 | Hayashi et al. | 303/116 |
| 4,340,258 | 7/1982 | Farr | 303/116 X |
| 4,346,944 | 8/1982 | Leiber | 303/116 X |

Primary Examiner—Douglas C. Butler
Attorney, Agent, or Firm—Posnack, Roberts, Cohen & Spiecens

[57] ABSTRACT

An improved anti-lock brake device of simple and compact construction adapted for use with a motorcycle having front and rear master cylinders for actuating front and rear wheel brakes, respectively. The front master cylinder has a first brake chamber for producing a brake torque for a front road wheel and a first control chamber for controlling the brake torque so as to prevent locking of the front wheel. The rear master cylinder has a second brake chamber for producing a brake torque for a rear road wheel and a second control chamber for controlling the brake torque so as to prevent locking of the rear wheel. The control chambers are each in communication with a single common source of oil pressure through a first control valve and with an oil tank through a second control valve.

16 Claims, 9 Drawing Figures

VEHICULAR ANTI-LOCK BRAKE DEVICE

BACKGROUND OF THE INVENTION

The present invention relates to wheeled vehicles such as a motorcycle provided with a front master cylinder and a rear master cylinder capable of separately actuating a front wheel brake and a rear wheel brake, and more specifically, to an anti-lock brake device which can efficiently brake the front and rear wheels without locking of these wheels under braking operation.

Some of the present inventors have already proposed a brake device of the type as described in U.S. Pat. No. 4,315,659 in which an operating portion of the wheel brake is provided with a control oil pressure chamber which may apply back pressure to the operating portion to decrease the braking torque generated in the wheel brake, and the control oil pressure chamber is selectively placed in communication with an oil tank and an oil pressure source through control valves.

SUMMARY OF THE INVENTION

It is a primary object of the present invention to provide an anti-lock brake device for vehicles of the character as described which is simple in construction and in which anti-lock control for mutually independent front and rear wheel brakes may be carried out by a single common oil pressure source.

It is a further object of the present invention to provide a simple and effective anti-lock brake device of the character as described which is particularly adapted for use with motorcycles, and which can always positively carry out the anti-lock control without affecting the operation of the motorcycle and which does not impair the operating stability of the motorcycle.

It is another object of the present invention to enable the aforementioned anti-lock brake device to be convenient for maintenance, in which brake oil for actuating the front and rear wheel brakes and control oil for effecting anti-lock control for the respective wheel brakes can be in common and can be replenished from a single port.

It is yet another object of the present invention to provide the aforementioned anti-lock brake device which does not at all impede reciprocating movement of a control piston slidably fitted in a cylinder bore of the master cylinder to define a control oil pressure chamber, and in which even if working oil leaks from the control oil pressure chamber, the leaking oil may be naturally returned to the oil tank to prevent the resulting smearing of the outer surface of the master cylinder as well as useless consumption of working oil, and which can effectively prevent the presence of bubbles in the working oil.

It is still another object of the present invention to provide the aforementioned anti-lock brake device in which control valves, accumulators and the like necessary for the lock control of the wheels during braking are formed in a unit to eliminate connecting conduits between such elements thereby simplifying the control section while rendering it compact.

The above and other objects, features and advantages of the invention will be more fully understood from the following detailed description of the invention when read in conjunction with the accompanying drawings which illustrate a presently preferred embodiment of the invention.

DESCRIPTION OF THE PREFERRED EMBODIMENTS

Figure 1:
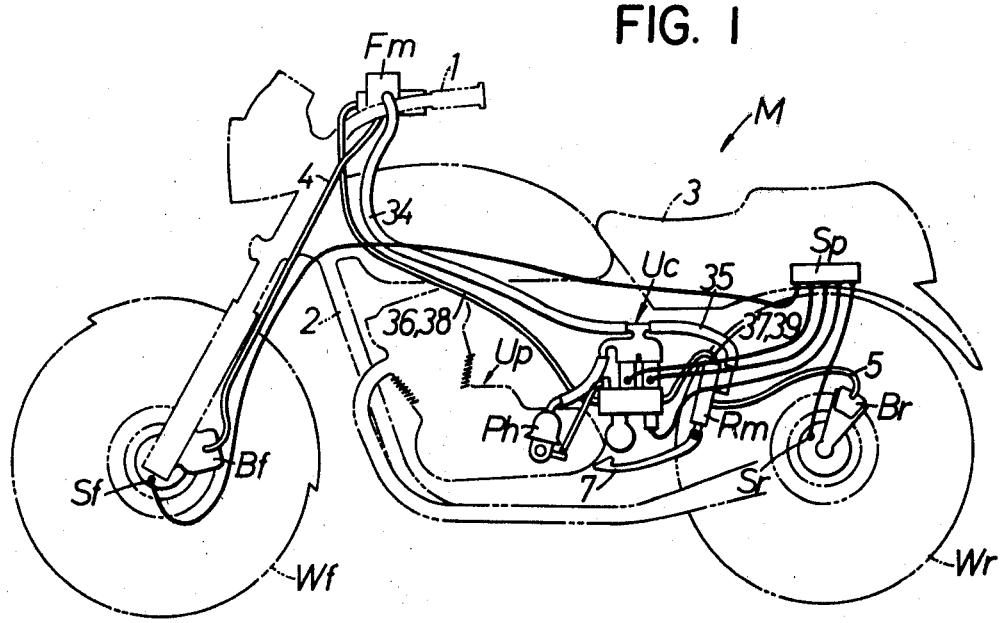
FIG. 1 is a side view of a motorcycle provided with a brake control device having a pair of front and rear master cylinders in accordance with the present invention.
Figure 2:
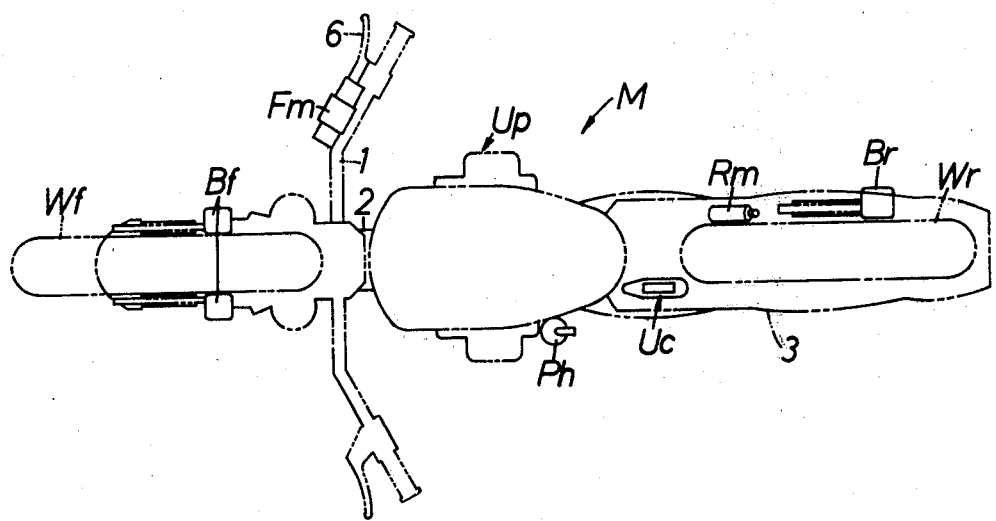
FIG. 2 is a plan view of the same.

Referring now to FIGS. 1 and 2, a motorcycle M has a front wheel brake Bf and a rear wheel brake Br which are of the hydraulically-operated type, the front wheel brake Bf being placed in communication with a front master cylinder Fm provided on a steering handle 1 through a conduit 4 whereas the rear wheel brake Br is placed in communication with a rear master cylinder Rm provided on a vehicle frame 2 below a saddle 3 through a conduit 5. The front master cylinder Fm is operated by a brake lever 6 and the rear master cylinder Rm is operated by a brake pedal 7.

In between the front and rear wheels Wf, Wr of the motorcycle M, a power unit Up is carried on the vehicle frame 2, and directly behind the power unit Up is disposed a lock control unit Uc for controlling the operation of the master cylinders Fm and Rm, when braking is applied, to control locking of the front and rear wheels Wf and Wr with respect to the road surface. The control unit Uc is supplied with a signal for controlling the front master cylinder Fm which is produced from a front wheel speed sensor Sf provided on the front wheel Wf, and with a signal for controlling the rear master cylinder Rm which is produced from a rear wheel speed sensor Sr provided on the rear wheel Wr, these signals being fed to the control unit Uc through a signal processor Sp.

Figure 3:
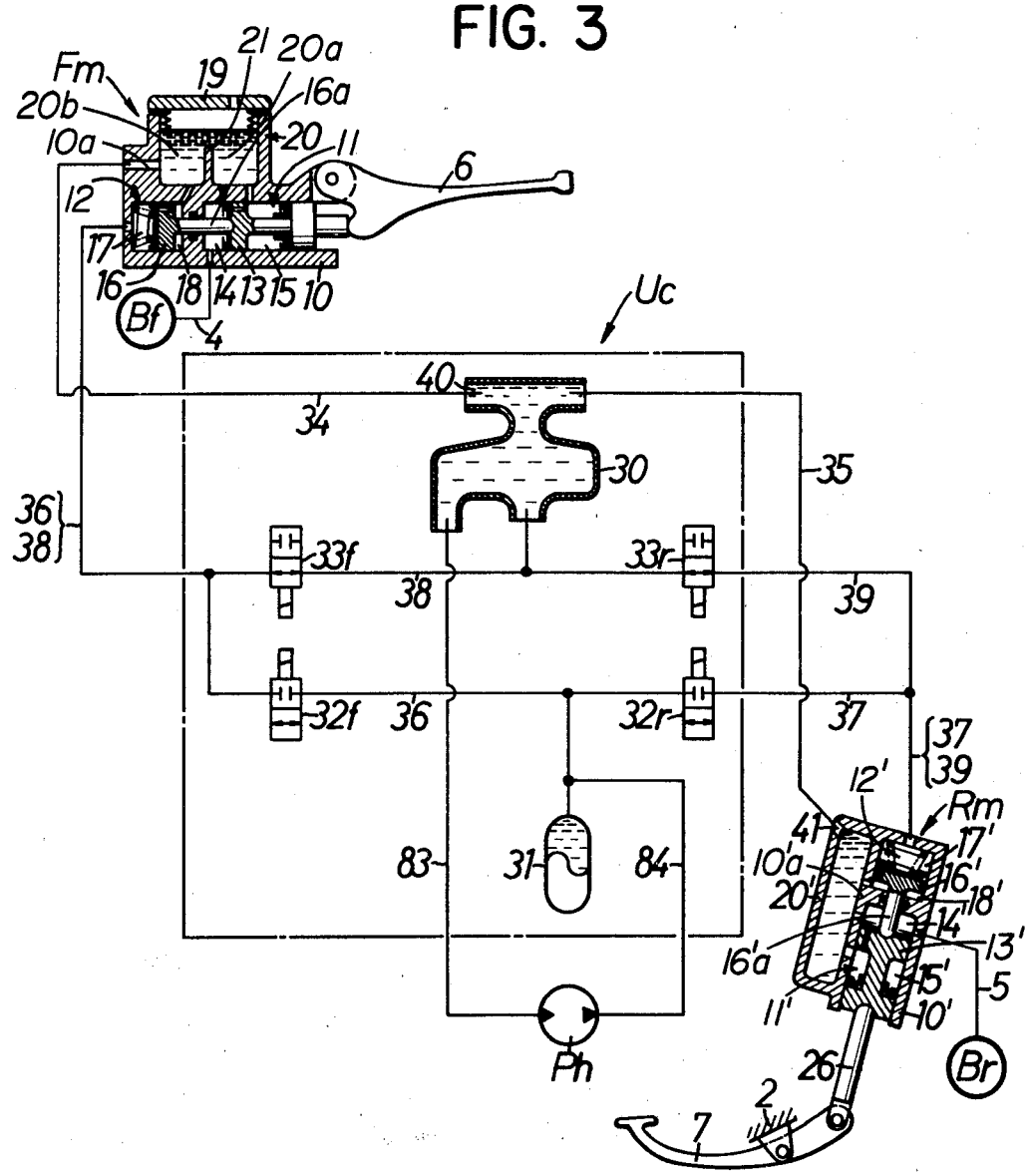
FIG. 3 illustrates a brake hydraulic circuit for the brake control device.
Figure 4:
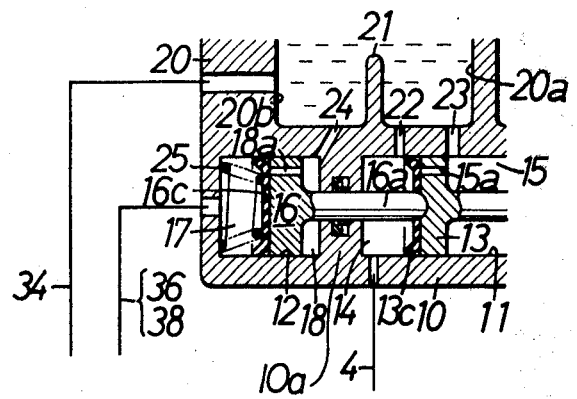
FIG. 4 is an enlarged longitudinal sectional view showing an essential portion of the front master cylinder.

The above-described components are constructed as shown in FIG. 3. A cylinder body 10 of the front master cylinder Fm has two serially aligned first and second cylinder bores 11 and 12 divided by a partition 10a. The first cylinder bore 11 has a brake piston 13 slidably fitted therein to define a front brake oil pressure chamber 14 and a rear oil-supply chamber 15 whereas the second cylinder bore 12 has a control piston 16 slidably fitted therein to define a front control oil pressure chamber 17 and a back chamber or an oil supply chamber 18. The brake piston 13 has its rear end connected to the brake lever 6, and the control piston 16 has a piston rod 16a extended from a rear end thereof, the piston rod extending through the partition 10a between both the cylinder bores 11 and 12 so as to abut against the front end of the brake piston 13. Supply ports 15a and 18a (FIG. 4), which are in communication with the oil supply chambers 15 and 18 are respectively open the the front surfaces of the pistons 13 and 16, and elastic seal cups 13c and 16c capable of opening and closing these supply ports are respectively provided on the front surfaces of the pistons 13 and 16. An oil tank 20 having a replenishing port for oil supply covered with a cap 19 is integral with the upper end of the cylinder body 10. The oil tank is interiorly divided, by a partition 21 having a given height, into first and second oil reservoirs 20a and 20b. The first reservoir 20a is placed in communication with the brake oil pressure chamber 14 through a relief port 22 and with the oil supply chamber 15 through a supply port 23 when the brake piston 13 is in its retracted position, as shown in FIGS. 3 and 4, whereas the second reservoir 20b is placed in communication with the oil supply chamber 18 through a supply port 24.

A retrun spring 25 for biasing both the pistons 13 and 16 in a retracting direction is retained within the control oil pressure chamber 17, and the conduit 4 leading to the front wheel brake Bf is connected to the brake oil pressure chamber 14.

The reason why the interior of the oil tank 20 is partitioned by the partition 21 into the first and second oil reservoirs 20a and 20b as described above is that if an oil leakage should occur in the oil passage of the system having control oil pressure chamber 17, the oil reservoir 20a feeding the brake oil pressure chamber 14 is prevented from being completely depleted so as to ensure the proper operation of the front wheel brake Bf. It will be noted that working oil is normally stored within the oil tank 20 to the extent that its oil level is higher than the partition 21.

The rear master cylinder Rm has a construction substantially similar to that of the front master cylinder Fm except that a vertical type is employed; accordingly, elements, of the rear master cylinder. Rm corresponding to those of the front master cylinder Fm are given the same reference characters with primes the brake piston 13' is connected to the brake pedal 7 through a push rod 26, the oil tank 20' has no cap and partition. The aforesaid conduit 5 lading to the rear wheel brake Br is connected to brake oil pressure chamber 14' of the rear master cylinder Rm.

The lock control unit Uc comprises a transparent auxiliary oil tank 30, an accumulator 31, a pair of normally closed electromagnetic control valves 32f, 32r, and a pair of normally open electromagnetic control valves 33f, 33r. The auxiliary oil tank 30 is interposed between the oil tanks 20, 20' of the front and rear master cylinders Fm, Rm and connected therewith through conduits 34, 35. One normally closed control valve 32f is disposed in an oil passage 36 connecting the accumulator 31 with the control oil pressure chamber 17 of the front master cylinder Fm whereas the other normally closed control valve 32r is disposed in an oil passage 37 connecting the accumulator 31 with the control oil pressure chamber 17' of the rear master cylinder Rm. Also, one normally open control valve 33f is disposed in an oil passage 38 connecting the oil tank 30 with the control oil pressure chamber 17 of the front master cylinder Fm whereas the other normally open control valve 33r is disposed in an oil passage 39 connecting the auxiliary oil tank 30 with the control oil pressure chamber 17' of the rear master cylinder Rm.

Reference character Ph designates a hydraulic pump for supplying pressure oil to the accumulator 31, whose construction will be described in detail later.

As can be seen from FIGS. 1 and 3, three oil tanks 20, 30 and 20 communicating with one another are arranged vertically from top to bottom in this order so that when oil is poured into the uppermost oil tank 20 after removing the cap 19, working oil may also be filled into the other two oil tanks 30 and 20 positioned lower than the uppermost one. In this case, inlets 40 and 41 of the middle and lower oil tanks 30 and 20 may be advantageously positioned at uppermost portions of the respective oil tanks so as to prevent bubbles from staying within the respective oil tanks.

Figure 5:
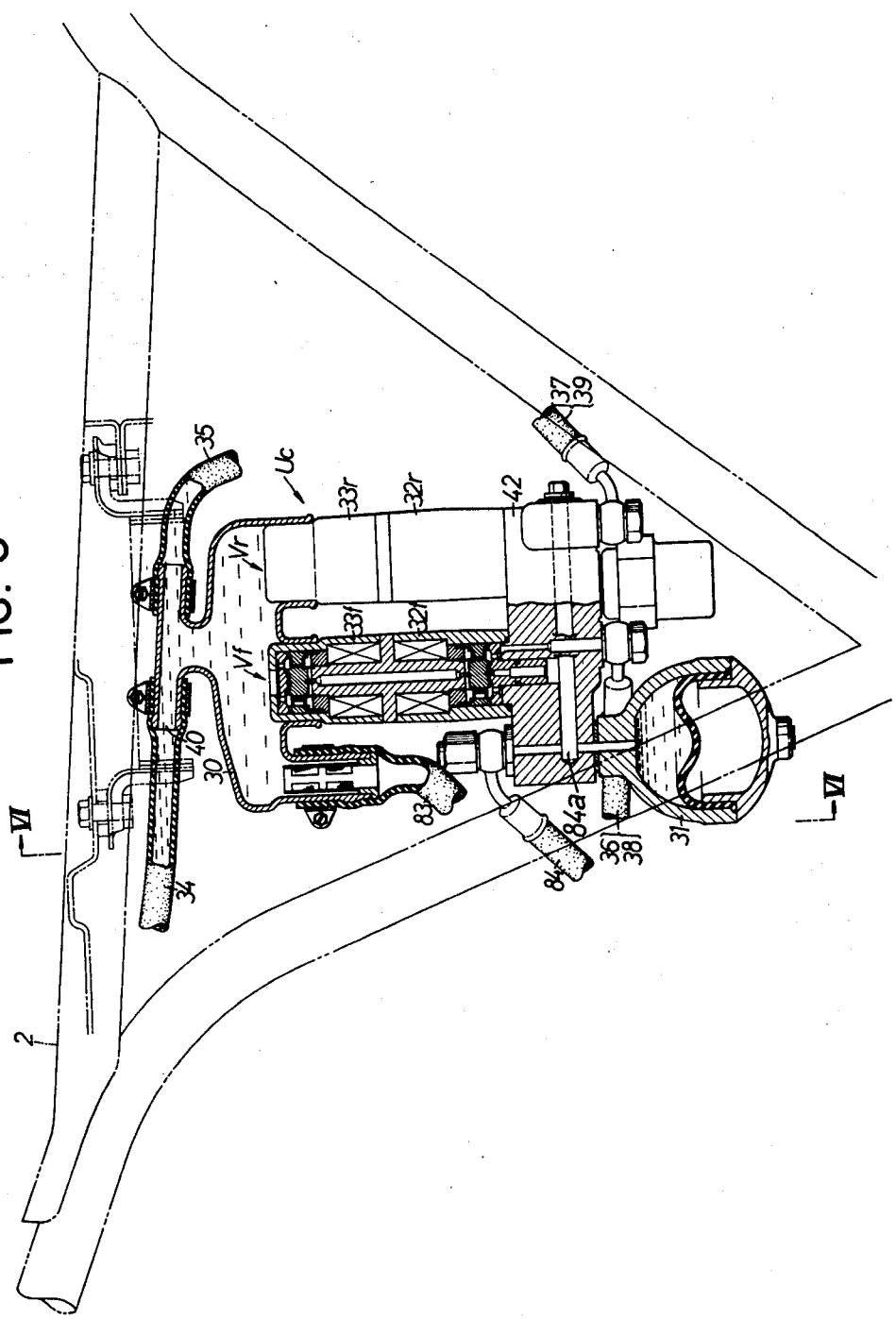
FIG. 5 is a partly cut away side view of a control unit of the brake control device.
Figure 6:
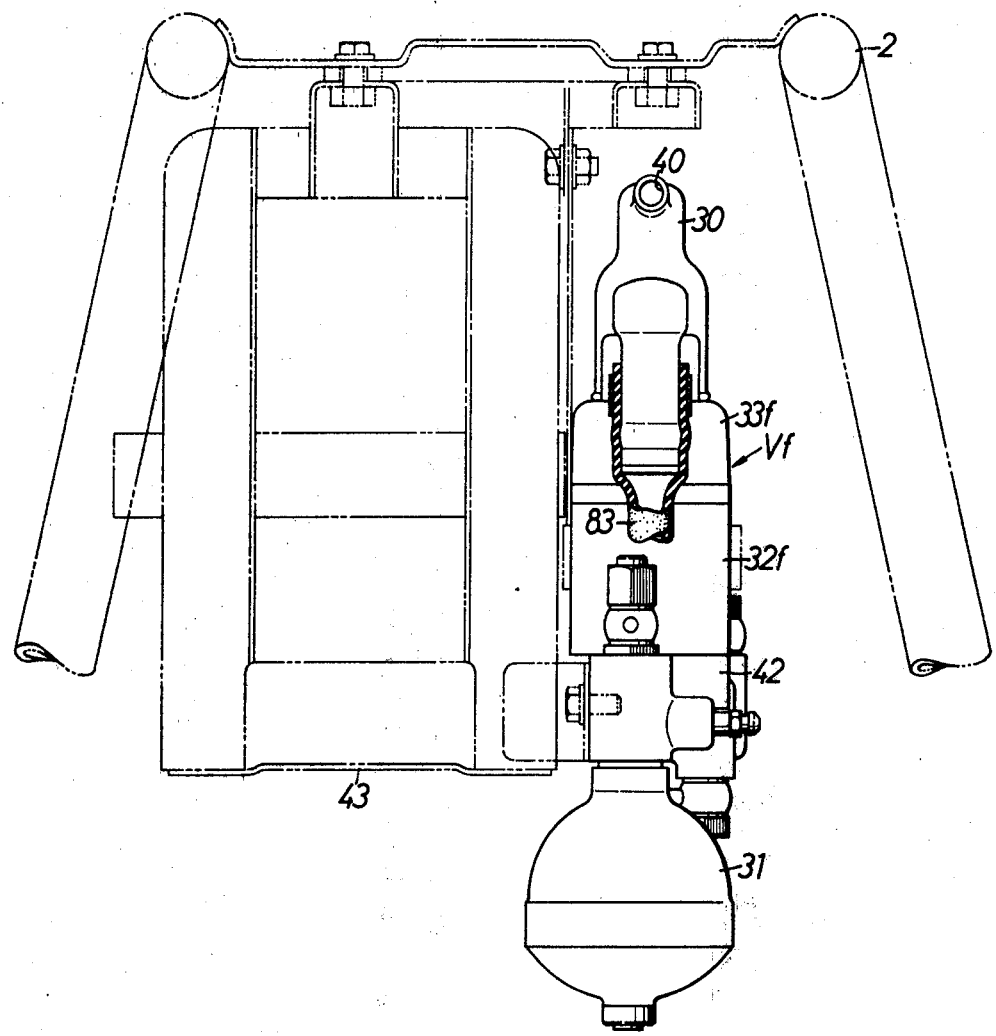
FIG. 6 is a front view of the control unit.

The above-described control unit Uc is more specifically shown in FIGS. 5 and 6. As can be seen from these drawings, the control unit Uc is disposed in the vicinity of a laterally central portion of the vehicle body 2 between the power unit Up and the rear wheel Wr. That is, a base member 42 of the control unit Uc is fixedly mounted, together with a battery box 43, on the frame 2 of the motorcycle M in the vicinity of a laterally central portion thereof. The base member 42 has an upper surface on which are mounted a columnar front control valve unit Vf including the normally closed control valve 32f and the normally open control valve 33f which is integrally connected to the upper end of the normally closed control valve 32f, and a similar columnar rear control valve unit Vr including the normally closed control valve 32r and the normally open control valve 33r which is integrally connected to the upper end of the normally closed control valve 32r. The auxiliary oil tank 30 is mounted on the upper ends of these units Vf and Vr, that is, on the control valves 33f and 33r and serves to connect them. The accumulator 31 is mounted on the undersurface of the base 42 and the base 42 is further provided with a high pressure oil passage 84a which provides communication between the control valves 32f, 32r and the accumulator 31 and communication between said control valves and the hydraulic pump Ph. Thus, the control unit Uc is formed flat as a whole so that it may be easily installed within the narrow vehicle body 2 and arranged adjacent the battery box 43 within the vehicle body 2.

Next, the construction of the above-described power unit Up will be explained with reference to FIG. 7. The power unit Up comprises an engine E and a speed change gear T which are covered with a common casing 50. Within the casing 50 there are provided a crank shaft 51, an intermediate shaft 52, and speed changing input and output shafts 53, 54, which are disposed parallel to one another in this order from the front portion of the casing to the rear portion thereof. The intermediate shaft and the speed changing input and output shafts 53, 54 are shorter in axial length than the crank shaft 51. The input shaft 53 has a starting clutch 55 disposed at the input end thereof. Output torque of the crank shaft 51 is transmitted to the intermediate shaft 52 through primary reduction gears (or sprockets) 56, 57 and thence to the starting clutch 55 through secondary reduction gears (or sprockets) 58, 59. When the clutch 55 is engaged, torque is transmitted from the input shaft 53 to the output shaft 54 via a speed change gear mechanism 60.

The output shaft 54 is provided at its end opposite the clutch 55 extended outside the casing 50 with a driving sprocket 61. When torque is transmitted to the driving sprocket 61, the rear wheel Wr is driven through a chain 62.

Further, within the casing 50, a pump driving shaft 65 driven by the intermediate shaft 52 through gears 63 and 64 is disposed parallel to the intermediate shaft 52 the hydraulic pump Ph and a lubricating pump Pl for the engine are driven by rotation of the pump driving shaft 65. Both the pumps are mounted on the side wall of the casing 50 opposite the clutch 55 so as to be disposed behind the crank chamber accommodating the crank shaft 51. Such an arrangement of the pumps allows effective utilization of a dead space adjacent the casing 50 opposite the clutch 55.

Figure 8:
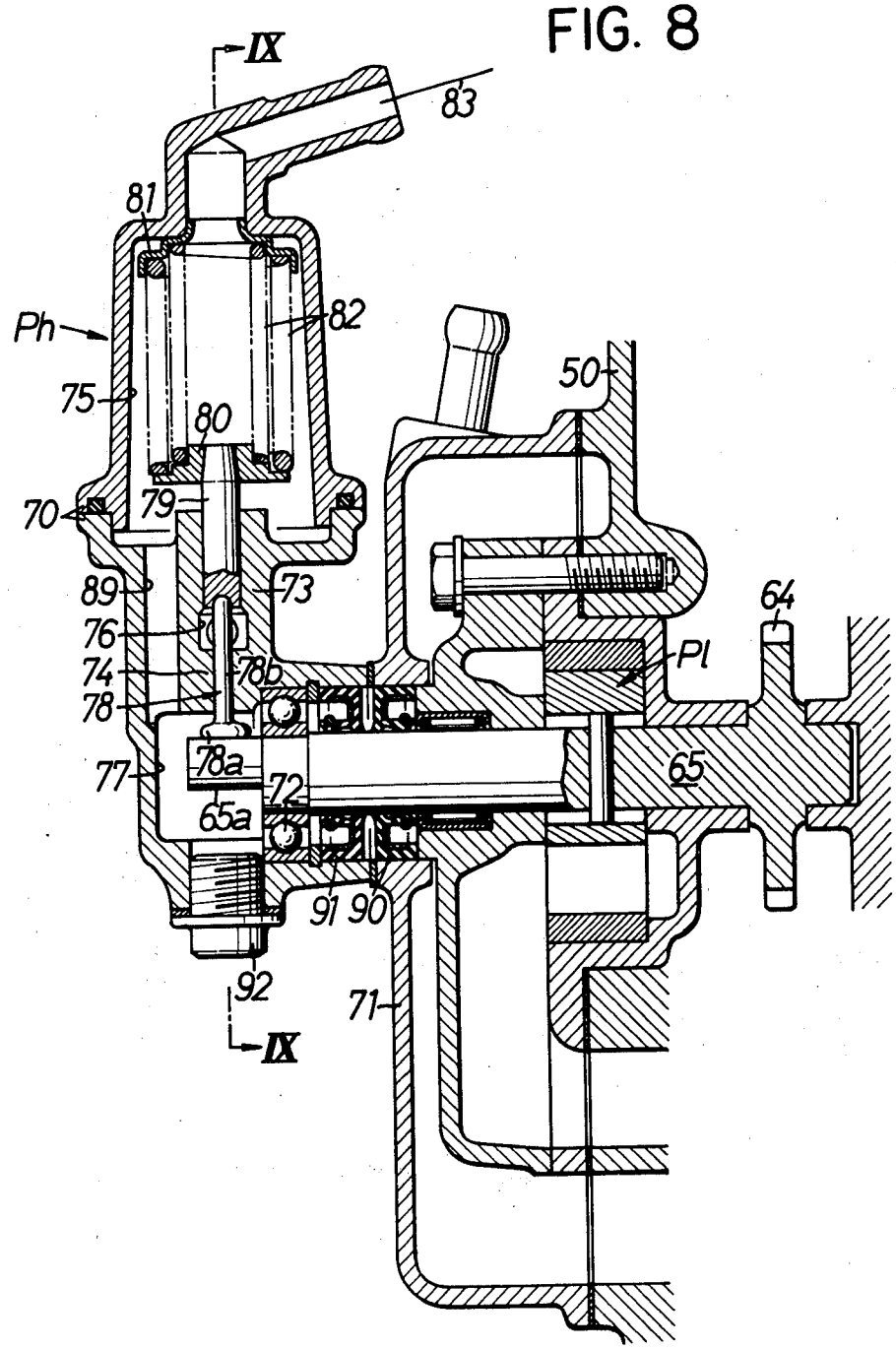
FIG. 8 is a front view in longitudinal section of a hydraulic pump and its related parts.
Figure 9:
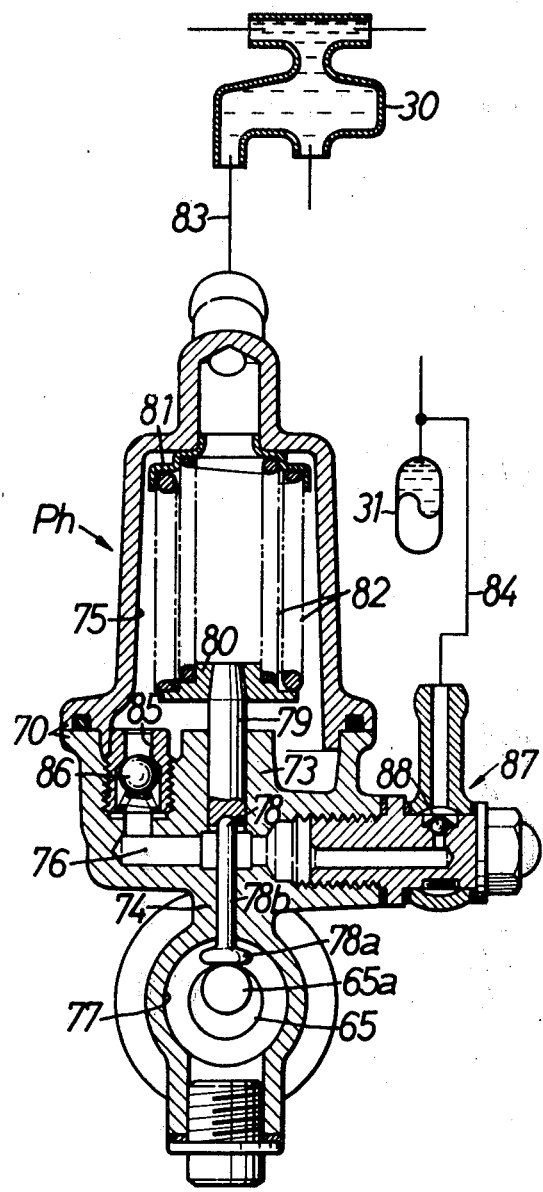
FIG. 9 is a sectional view taken along line IX—IX of in FIG. 8.

The construction of the hydraulic pump Ph is specifically illustrated in FIGS. 8 and 9. A pump body 70 of the hydraulic pump Ph is detachably secured to the outer side of the casing 50 through a cover member 71 and carries an outer end of the pump driving shaft 65 through a bearing 72. The pump body 70 is interiorly divided by a pair of upper and lower partitions 73, 74 into a spring chamber 75, a pump chamber 76 and an operating chamber 77 positioned in this order from the top to the bottom. An eccentric cam 65a extended from the outer end of the pump driving shaft 65 protrudes into the operating chamber 77, and a large diameter base portion 78a of a tappet 78 engages the peripheral surface of the cam. A shaft portion 78b of the tappet 78 slidably extends through the partition 74 into the pump chamber 76 and bears on the lower end of a plunger 79 which slidably extends through the partition 73. The tappet 78 has a smaller diameter than that of the plunger 79. A movable seat plate 80 and a fixed seat plate 81 are respectively mounted on the upper end of the plunger 79 extending into the spring chamber 75 and on the ceiling wall of the spring chamber 75 and a spring 82 with a given set load (for example, 60 kg) is retained between both the seat plates 80 and 81.

The spring chamber 75 is in communcation with the auxiliary oil tank 30 of the control unit Uc through a conduit 83, and the pump chamber 76 is in communication with a high pressure oil passage 84a of the base member 42 through a conduit 84. Thus, the hydraulic pump Ph communicates with the control valves 32f, 32r and accumulator 31.

The partition 73 is formed with an oil passage 85 to provide communication between the spring chamber 75 and the pump chamber 76. The oil passage 85 has a one-way valve or an intake valve 86 to allow fluid flow only in one direction from the spring chamber 75 to the pump chamber 76. A passage within a banjo coupling 87 for connecting the pump chamber 76 with the conduit 84 is provided with a one-way valve or a discharge valve 88 to allow fluid flow only in one direction from the pump chamber 76 to the accumulator 31.

Further, the spring chamber 75 and the operating chamber 77 are connected with each other through an oil passage 89 so that working oil flowing into the spring chamber 75 is introduced as lubricating oil into the operating chamber 77.

Within the cover member 71, the lubricating pump Pl is mounted on the casing 50. The pump Pl is a well known trochoid type pump, which need not be explained further.

In FIG. 8, reference numerals 90 and 91 denote oil seals which are respectively mounted in openings in the cover member 71 and the pump body 70 through which the pump driving shaft 65 extends, and reference numeral 92 denotes a drain bolt threaded into the pump body 70.

The operation of the aforementioned embodiment will be explained in the following.

Figure 7:
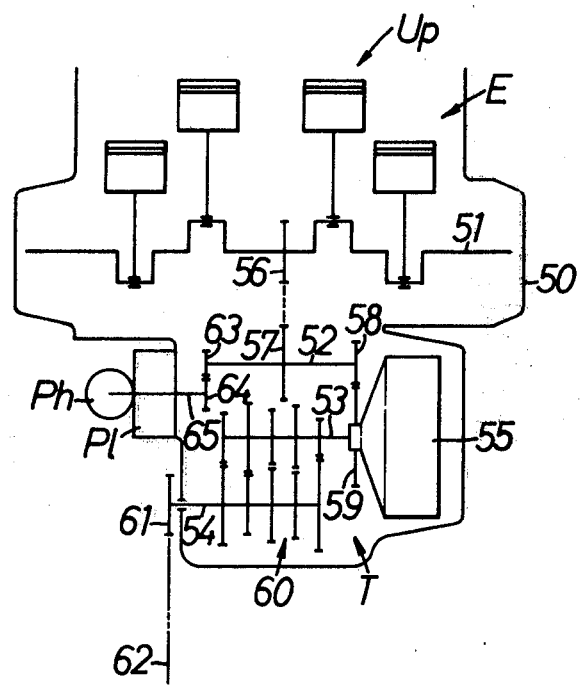
FIG. 7 is a schematic illustration of a power unit for the motorcycle as shown in FIG. 1.

First, during operation of the driving system of the pump, when the engine E is actuated, in FIG. 7, the pump driving shaft 65 is always driven by the crank shaft 51 through the gears 56, 57 at a reduced rate to simultaneously drive the lubricating pump Pl and the hydraulic pump Ph. Accordingly, even when the engine E is running at high speeds, the pumps Pl and Ph will not be driven at unnecessarily high speeds to effectively reduce the load of the engine E. Further, since both the pumps Pl and Ph receive power from the engine E not through the clutch 55, the pumps may continue their operation even when the clutch 55 is disengaged. In particular, the oil pressure pump Ph serves as an oil pressure source for the lock control of the front and rear wheel brakes Bf and Br, and thus it is useful in terms of the lock control to always place the pump in an operative condition irrespective of idling, loaded operation or the like of the engine E.

Next, during operation of the hydraulic pump Ph, in FIGS. 8 and 9, when the pump driving shaft 65 is rotated, the eccentric cam 65a which effects eccentric motion cooperates with the spring 82 to impart upward and downward reciprocating motion to the tappet 78 and the plunger 79. Such reciprocating motion causes repetitive expansion and contraction in volume of the pump chamber 76, and when in expansion, the intake valve 86 is opened by reduction in pressure within the pump chamber 76 to thereby suck oil, which is supplied from the oil tank 30 to the spring chamber 75, into the pump chamber 76, whereas when in contraction, the discharge valve 88 is opened by increase in pressure within the pump chamber 76 to thereby supply pressure oil from the pump chamber 76 to the accumulator 31. In this manner, when the oil pressure within the accumulator 31 increases to a predetermined value, the oil pressure within the pump chamber 76 also assumes a similar value so that the push up force of the oil pressure with respect to the plunger 79 becomes balanced with the push down force of the spring 82 or the set load to hold the plunger 79 at a position in the vicinity of the upper limit by the tappet 78 and only the tappet 78 follows the motion of the eccentric cam 65a for repetitive upward and downward movement. In this case, since the push down force of the tappet 78 results from oil pressure within the pump chamber 76, the intake valve 86 remains in its closed state by the oil pressure within the pump chamber 76 even if the tappet 78 is moved down. Thus, the hydraulic pump Ph stops its pumping action and does not impart a useless load to the engine E. While the pressing force resulting from the oil pressure within the pump chamber 76 acts on the contact surface between the tappet 78 and the eccentric cam 65a, the pressing force is negligible since the shaft diameter of the tappet 78 is relatively small and can be disregarded for the load of the engine E.

The operation of the brake system will now be explained (see FIGS. 3 and 4).

If, during the running of the vehicle, the brake lever 6 is operated to forwardly move the brake piston 13 of the front master cylinder Fm, the seal cup 13c passes the opening portion of the relief port 22 and oil pressure is then produced in the brake oil pressure chamber 14 at a value increasing in response to the amount of forward movement of the brake piston 13, which oil pressure is transmitted to the front wheel brake Bf via the conduit 4 to actuate front wheel brake Bf whereby the braking torque is applied to the front wheel Wf.

In this case, as the brake piston 13 moves forwardly, the control piston 16 also moves forwardly and the oil supply chamber 18 which increases in volume responsive to the forward movement of the control piston 16 sucks oil from the oil reservoir 20b without resistance through the supply port 24. Also, the oil passage 38 is normally held in a conductive condition by the normally open control valve 33f and therefore, as the control piston 16 moves forwardly, working oil within the control oil pressure chamber 17 is fed to the oil tank 30 without resistance via the conduit 34. Thus, the control piston 16 does not resist the operation of the brake piston 13.

Oil fed to the oil tank 30 is circulated into the oil reservoir 20b via the conduit 34.

When the front wheel Wf is about to lock with respect to the road by the above-mentioned braking operation, the signal processor Sp in FIG. 1 promptly judges such condition by means of an incoming signal produced by the front wheel speed sensor Sf to feed a valve opening signal to the normally closed control valve 32f and feed a valve closing signal to the normally open control valve 33f. When both the control valves 32f and 33f are respectively opened and closed by these signals, the oil passage 36 is placed in communication while the oil passage 38 is blocked so that pressure oil from the accumulator 31 is supplied to the control oil pressure chamber 17 of the front master cylinder Fm through the oil passage 36 to produce oil pressure by which the control piston 16 causes the brake piston 13 to be retracted slightly against the operating force of the brake lever 16, thus reducing pressure within the brake oil pressure chamber 14. As a result, the braking torque of the front wheel brake Bf decreases to avoid locking of the front wheel Wf.

Then, the signal processor Sp perceives the above condition to return both the control valves 32f and 33f to their normal positions and reduce pressure within the control oil pressure chamber 17. As a consequence, the braking torque of the front wheel brake Bf increases again and the aforesaid operation is repeatedly carried out at high speed to thereby effectively brake the front wheel Wf without occurrence of locking.

When the brake lever 6 is released to relieve the front wheel Wf of braking force, both the pistons 13 and 16 are retracted by the force of the return spring 25, as a consequence of which pressure within the brake oil pressure chamber 14 is reduced to a level below atmospheric pressure. Then, the outer peripheral portion of the seal cup 13c is flexed towards the brake oil pressure chamber 14 due to a pressure difference between the pressure within the brake oil pressure chamber 14 and the atmospheric pressure within the oil supply chamber 15 to form a clearance between itself and the inner wall of the cylinder bore 11 to feed oil from the oil supply chamber 15 to the brake oil pressure chamber 14 through the communication port 15a, and surplus oil is returned to the oil reservoir 20a through the relief port 22. During this period, oil is supplied to the oil supply chamber 15 through the supply port 23 from the oil reservoir 20a.

On the other hand, even when the control piston 16 is retracted, oil is supplied to the control oil pressure chamber 17 through the communication port 18a from the oil supply chamber 18 in a manner similar to the former. Accordingly, particularly by reciprocating motion of the control piston 16, an oil circulation occurs along a path consisting of the oil reservoir 20b, the oil supply chamber 18, the control oil pressure chamber 17, the oil passage 38, the oil tank 30, the conduit 34 and the oil reservoir 20b to thereby prevent bubbles from remaining in the control oil pressure circuit including the control oil pressure chamber 17.

It will be obvious that when the brake pedal 7 is operated to actuate the rear master cylinder Rm, the rear wheel brake Br is actuated in a manner similar to the front wheel brake and when the rear wheel Wr is about to lock, the normally closed control valve 32r and the normally open control valve 33r are actuated to apply back pressure to the rear master cylinder Rm to avoid locking of the rear wheel Wr.

It is to be noted that the anti-lock brake device of the invention is most suitable for motorcycles but may be used with any other wheeled vehicles such as automobiles.

As described above, according to the present invention, there is provided an anti-lock brake device for a motorcycle which includes a front master cylinder and a rear master cylinder. The front master cylinder has a first brake chamber for producing a brake torque applied to a front road wheel and a first control chamber for controlling the brake torque produced by the first brake chamber so as to prevent locking of the front wheel. The rear master cylinder has a second brake chamber for producing a brake torque applied to a rear road wheel and a second control chamber for controlling the brake torque produced by the second brake chamber so as to prevent locking of the rear wheel. The control chambers are each in communication with a single common source of oil pressure through a first control valve and with an oil tank means through a second control valve. With this arrangement, when braking force is applied, the front and rear wheel brakes may be separately controlled in an anti-lock manner by actuation of the control valves in each of the front and rear brake control systems and thus even if the front and rear master cylinders independent of each other are actuated by an operator without any fine control, an extremely efficient braking is achieved at all times, rendering the braking operation quite easy. In addition, use of a common oil pressure source for the front and rear wheel brake systems renders the structure simple and the control unit including the oil pressure source may be formed as a compact structure and may be installed readily into a narrow space of the vehicle body.

Furthermore, the oil tank, the accumulator and the control valve are formed as a single unit and accordingly, the construction of the control oil pressure circuit can be simplified. The above-mentioned components can not only be inspected and repaired at one place but also all the components can be replaced at one time by replacing the whole unit with a new one, thus offering a great convenience in maintenance and inspection.

Also, the above-mentioned control unit is disposed in the vicinity of the laterally central portion of the vehicle body between the power unit and the rear wheel. Therefore, even if rolling or pitching motion of the motorcycle should occur during travel, the control unit would not be vibrated severely thus avoiding the resulting inconveniences such as malfunction of the control valves and formation of bubbles in oil, thus always providing a proper anti-lock control.

The control unit is disposed in proximity to the center of gravity of the motorcycle and thus the components of the control unit are concentrated in weight at one place, and with this arrangement, the maneuvering stability of the motorcycle is not at all impaired.

Moreover, the first and second main oil tanks of the front and rear master cylinders are arranged one above the other and the auxiliary oil tank is arranged at a height between the first and second main oil tanks. The uppermost oil tank is provided with a replenishing port so that, working oil supplied through the replenishing port of the uppermost oil tank may be also fed under gravity to the other two oil tanks, that is, a supply to all the oil tanks of working oil may be accomplished simply through a single replenishing port without using a special pressure-feeding device, which is extremely advantageous in maintenance.

In addition, the uppermost oil tank of the front master cylinder is connected to an inlet in the upper portion of the intermediate auxiliary oil tank which is in turn connected to an inlet in the upperportion of the lowermost oil tank of the rear master cylinder so that if bubbles are generated in the auxiliary oil tank and the second main oil tank of the rear master cylinder, the bubbles naturally move upward out of the inlets without remaining in the oil tanks and then enter the upper oil tank and finally are discharged into the space over the oil surface in the uppermost oil tank, whereby proper working oil not containing bubbles may be supplied at all times to the brake oil pressure chamber and the control oil pressure chamber of each of the master cylinders.

Further, the cylinder body has a pair of serially aligned first and second cylinder bores divided by a partition, the first cylinder bore accommodating therein a brake piston such that the brake oil pressure chamber in communication with the wheel brake is defined by the brake piston, the second cylinder bore accommodating therein a control piston such that the control oil pressure chamber is defined by the control piston, and the brake and control pistons are operatively connected with each other through a piston rod extending through the partition in a manner such that when control oil pressure is introduced into the control oil pressure chamber, the retracting force is applied to the brake piston from the control piston. Accordingly, the master cylinder with the control piston may be miniaturized by a series arrangement of the brake piston and the control piston, and since the controlling force for reducing brake torque may be directly applied to the brake piston from the control piston, the lock control of the wheels may be positively carried out.

Moreover, the oil supply chamber defined between the control piston and the partition is placed in communication with the oil tank disposed on the cylinder body through a supply port and with the control oil pressure chamber through a communication port formed through the control piston, and an elastic seal cup is disposed on the front surface of the control piston to close the communication port in a normal condition but open it when pressure within the control oil pressure chamber is reduced. With this arrangement, as the control piston moves reciprocatingly, working oil may be automatically circulated from the oil tank to the control oil pressure chamber via the oil supply chamber, as a consequence of which the reciprocal movement of the control piston is not at all impaired by the back chamber or the oil supply chamber at the back side of the control piston, and in addition, bubbles in the control oil pressure chamber are prevented from remaining therein to effectively apply the control oil pressure to the control piston. Further, even if working oil leaks into the oil supply chamber from the control oil pressure chamber or the brake oil pressure chamber, the leaked oil may be naturally returned to the oil tank to thereby prevent the master cylinder from being smeared by the leaked oil and avoid useless consumption of working oil.

While one presently preferred embodiment of the invention has been shown and described, it will be apparent to those skilled in the art that various changes or modifications can be made without departing from the spirit of the invention or the scope of the appended claims.

What is claimed is:

1. A vehicular anti-lock brake device comprising a first master cylinder including a cylinder body having a pair of serially aligned first and second cylinder bores divided by a partition; an operating piston slidable in said first cylinder bore and defining therein a brake chamber for applying brake oil pressure to said operating piston to produce a brake torque for a front wheel of the vehicle; a control piston slidable in said second cylinder bore and defining therein a control chamber for applying control oil pressure to said control piston; a piston rod extending through said partition between said first and second cylinder bores and operably connecting said control piston to said brake piston for applying a retracting force to said brake piston to reduce the brake torque when operating oil is introduced into said control chamber to prevent locking of the front wheel; and an oil tank having an interior partition of given height dividing the tank into a first oil reservoir for feeding operating oil to said brake chamber and a second oil reservoir; a second master cylinder including a cylinder body, an operating piston, a control piston and an oil tank, said operating piston of said second master cylinder defining a second brake chamber for applying brake oil pressure to the operating piston of said second motor cylinder to produce brake torque for a rear wheel of the vehicle, said control piston of the second master cylinder defining a control chamber in said cylinder body of the second master cylinder for applying control oil pressure to said control piston to prevent locking of the rear wheel, said brake chambers of the first and second master cylinders being hydraulically disconnected from one another to form independent brake systems for the front and rear wheels, an auxiliary oil tank connected to the oil tanks of the first and second master cylinders, a hydraulic pump having an inlet and an outlet, said auxiliary oil tank being connected to the inlet of said hydraulic pump; first and second normally open control valves and first and second normally closed control valves, said outlet of said hydraulic pump being connected through said normally closed first and second control valves respectively to said control chambers of said first and second master cylinders, said auxiliary oil tank being connected through said normally closed first and second control valves respectively to said control chambers of said first and second master cylinders.

2. A vehicular anti-lock brake device according to claim 1 comprising an oil supply chamber defined between said control piston and said partition of said first master cylinder and being in communication with said oil tank thereof which is disposed adjacent and over said first master cylinder body.

3. A vehicular anti-lock brake device according to claim 2 wherein said oil tank of said first master cylinder is above said cylinder bores.

4. A vehicular anti-lock brake device according to claim 3 wherein said oil tank is integrally formed in said first master cylinder body.

5. A vehicular anti-lock brake device according to claim 1 wherein said control piston of said first master cylinder is provided with a communication port for providing communication between said control and supply chambers of said first master cylinder, and an elastic seal cup disposed on said control piston of said first master cylinder to normally close said communication port and to open it when pressure in said control chamber is reduced.

6. An anti-lock brake device for a motorcycle having front and rear wheels with respective brakes and brake cylinders, said anti-lock brake device comprising a front master cylinder having a first brake chamber connected to a front wheel cylinder for producing a brake torque applied to the front wheel and first control chamber means for controlling the brake torque produced by said first brake chamber to prevent locking of said front wheel, a rear master cylinder having a second brake chamber connected to a rear wheel cylinder for producing a brake torque applied to the rear wheel and second control chamber means for controlling the brake torque produced by said second brake chamber to prevent locking of said rear wheel, said first and second brake chambers being hydraulically disconnected from each other to form a pair of independent brake systems for said front and rear wheels; a single common source of oil pressure connected to said first control chamber means through a first normally closed control valve and to said second control chamber means through a second normally closed control valve, a first main oil tank on said front master cylinder in communication with said first brake chamber, a second main oil tank on said rear master cylinder in communication with said second brake chamber, an oil passage connecting said first and second main oil tanks, and an auxiliary oil tank disposed in said oil passage and connected to said first control chamber means through a first normally open control valve and to said second control chamber means through a second normally open control valve.

7. An anti-lock brake device according to claim 6 wherein said oil pressure source, said first and second normally closed control valves and said first and second normally open control valves are assembled as a unit.

8. An anti-lock brake device according to claim 7 wherein said oil pressure source comprises an accumulator, an oil passage connecting said auxiliary oil tank and said accumulator and a hydraulic pump in said oil passage for feeding pressure oil to said accumulator, said unit comprising a base member, said normally closed control valves, said normally open control valves and said accumulator being mounted on said base member with said auxiliary oil tank connected to said control valves, said base member being provided with a high pressure oil passage through which said normally closed control valves are in communication with said accumulator.

9. An anti-lock brake device according to claim 8 wherein said normally open and closed control valves are respectively superposed on one another on said base member with said auxiliary oil tank mounted at the top of said valves whereby a relatively flat upright shape is provided for said unit.

10. An anti-lock brake device according to claim 8 wherein said front and rear master cylinders each includes a control piston defining a supply chamber on a side opposite a respective control chamber, said supply chambers being in communication with respective main oil tanks.

11. An anti-lock brake device according to claim 10 wherein each control piston is provided with a respective communication port providing communication between said control and supply chambers of each of said master cylinders, and an elastic seal cup on each respective control piston to normally close the respective said communication port and to open said port when pressure in said related control chamber is reduced.

12. An anti-lock brake device according to claim 6 or 7 wherein said first oil tank is arranged above said second oil tank and said auxiliary oil tank is located at a height between said first and second main oil tanks, said first oil tank being provided with a replenishing port.

13. An anti-lock brake device according to claim 6 or 7 wherein said oil pressure source comprises an accumulator, an oil passage connecting said auxiliary oil tank and said accumulator and a hydraulic pump in said oil passage for feeding pressure oil to said accumulator.

14. An anti-lock brake device according to claim 13 wherein said hydraulic pump includes a drive member driven with reciprocating movement, a pump chamber in which said drive member travels, a driven member driven by the drive member, a supply chamber in communication with said oil tanks, said driven member traveling in said supply chamber to draw oil from said oil tanks to deliver the oil to said pump chamber, said pump chamber being connected to said accumulator to supply pressure oil thereto, and spring means acting on said driven member to oppose displacement thereof under the drive of said drive member, said driven member being subjected to the pressure in said pump chamber to remain at rest when said pressure balances the spring means whereupon the driven member remains at rest and said drive member travels alone.

15. An anti-lock brake device according to claim 14 wherein said hydraulic pump further comprises first one way valve means between said supply chamber and pump chamber to permit flow in one direction from the former to the latter and second one way valve means between the pump chamber and the accumulator to permit flow in one direction from the former to the latter.

16. An anti-lock brake device according to claim 15 comprising an oil conduit connecting said first oil tank to an inlet provided in said auxiliary oil tank at the upper portion thereof, and a second oil conduit connecting said auxiliary oil tank to an inlet provided in said second oil tank at the upper portion thereof.

* * * * *